United States Patent [19]

Sato et al.

[11] 3,812,517

[45] May 21, 1974

[54] CONTINUOUSLY VARIABLE THRESHOLD TRANSISTOR

[75] Inventors: Shuichi Sato, Tokyo; Tadanori Yamaguchi, Kanagawa, both of Japan

[73] Assignee: Sony Corporation, Tokyo, Japan

[22] Filed: Sept. 6, 1972

[21] Appl. No.: 286,839

[30] Foreign Application Priority Data

Sept. 8, 1971 Japan .............................. 46-69546

[52] U.S. Cl. .......... 357/23, 317/235 B, 317/235 G, 307/304

[51] Int. Cl. .............................................. H01l 11/14

[58] Field of Search ...... 317/235 B, 235 G; 307/304

[56] References Cited

UNITED STATES PATENTS

| | | | |
|---|---|---|---|
| 3,374,407 | 3/1968 | Olmstead | 317/235 |
| 3,528,064 | 9/1970 | Everhart et al. | 317/235 |
| 3,609,406 | 9/1971 | Walther | 317/235 |
| 3,697,786 | 10/1972 | Smith | 317/235 |

OTHER PUBLICATIONS

IBM Tech. Discl. Bul., "Field Effect Transistor Device" by Gaensslen et al., Vol. 13, No. 11, April 1971, page 3,345.

Proc. of the IEEE, "The Metal-Nitride-Oxide-Silicon (MNOS) Transistor Characteristics & Applications" by Frohman-Bentchkowsky, 8/70, pages 1,207 & 1,216.

*Primary Examiner*—Jerry D. Craig
*Attorney, Agent, or Firm*—Hill, Sherman, Meroni, Gross & Simpson

[57] ABSTRACT

A MAOS or a MNOS having stored charge carriers at the interface of the two insulating layers whose density varies progressively in a direction laterally across the gate region thereof; that is, in a direction at right angles to the drain-source axis. The charge injection in a MAOS or MNOS system is modified so that the density of the injected charges varies across the device in a continuously decreasing manner in a direction at right angles to a line between the drain and source. Either a contactless variable capacitor or a contactless variable resistor is provided. Furthermore, a particularly effective memory device is provided by the structure. Broadly, the invention comprises a silicon substrate, a MIS gate construction in which a carrier is stored, the density of the stored carriers being varied continuously across the substrate side of the insulator from one side to the other.

7 Claims, 26 Drawing Figures

CONTINUOUSLY VARIABLE THRESHOLD TRANSISTOR

BACKGROUND OF THE INVENTION

MIS FET devices in general are well known in the prior art. MAOS FET and MNOS FET devices are one special category of MIS FET devices and are also known in the prior art. The use of a MIS device as a memory device is described, for example, in U.S. Pat. No. 3,590,272. Charge injection in a MAOS device and a MNOS device are referred to in an article by P. Balk and F. Stephany, appearing in J. Electrochemical Soc., Vol. 118, No. 10, pages 1,634–1638, inclusive. Applicant is not aware of any prior art, however, which shows or suggests the particular structures of the present invention.

SUMMARY OF THE INVENTION

This invention relates particularly to a novel structure of the gate in a MAOS FET or in a MNOS FET.

It is an object of the present invention to provide a MIS FET having high mutual conductance and a good triode region.

It is a further object of the present invention to provide a novel memory gate FET in which a stored carrier density can be changed in accordance with or corresponding to a location of the gate region continuously.

It is a still further object of the present invention to provide an improved capacitor between the gate and the substrate.

It is a still further object of the present invention to provide a novel semiconductor device having a variable channel width depending upon a gate voltage.

It is another and further object of the present invention to provide a novel contactless volume control device.

It is another and further object of the present invention to provide a novel contactless variable capacitor.

A particular embodiment of the present invention comprises a substrate of an N-conductivity type with a drain region and a source region of a $P^+$ conductivity type extending in from one surface thereof. This surface of the substrate is covered by a silicon dioxide layer, which silicon dioxide layer in turn is covered by an aluminum oxide or silicon nitride layer, the gate electrode being formed on the outer face of the aluminum oxide or silicon nitride layer. A source electrode extends through the two insulating layers into contact with one of the two $P^+$ regions and a second drain electrode extends through the two insulating layers into contact with the other $P^+$ region. This much of the structure is a typical MAOS FET or a MNOS FET device.

The present invention, however, provides additionally two $N^+$ regions near the side edges of the substrate and extending in from the silicon dioxide layer. The two $N^+$ strips together with the two $P^+$ strips are generally in the form of a square or a rectangle. Electrodes are provided extending through the insulating layers into contact with the two $N^+$ regions and a voltage bias source is connected across the two $N^+$ strips. The gate bias source is connected across the gate electrode and the substrate.

DESCRIPTION OF THE PREFERRED EMBODIMENTS

Figure 1:
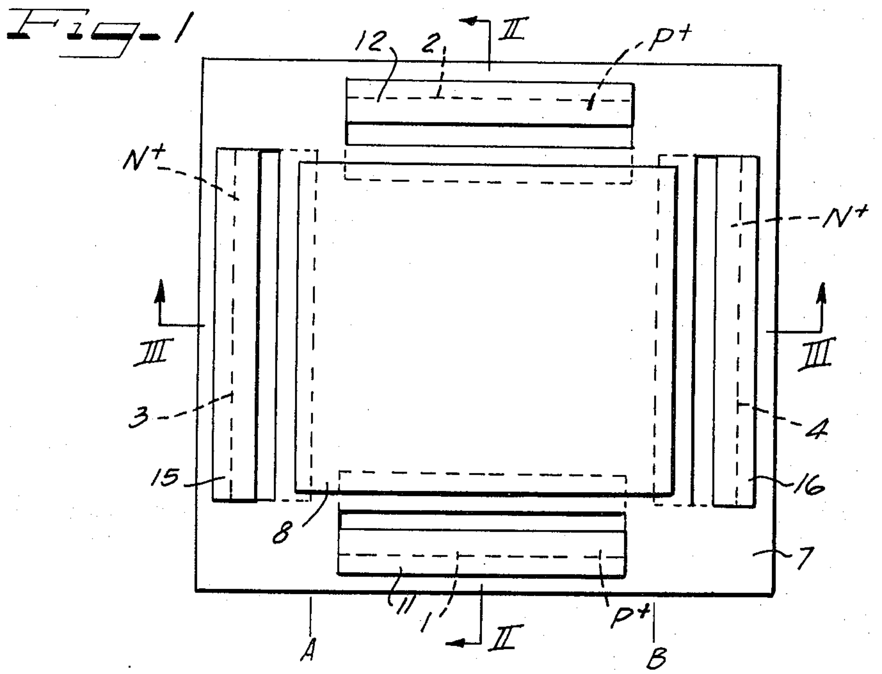
FIG. 1 is a diagrammatic plan view of a preferred embodiment of the present invention.
Figure 2:
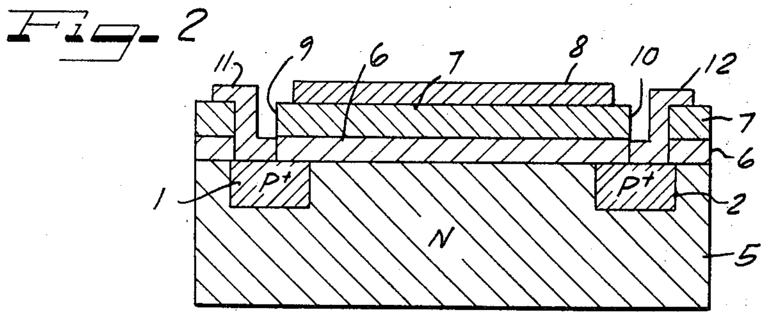
FIG. 2 is a sectional view of the device shown in FIG. 1 taken along the lines II—II thereof.
Figure 3:
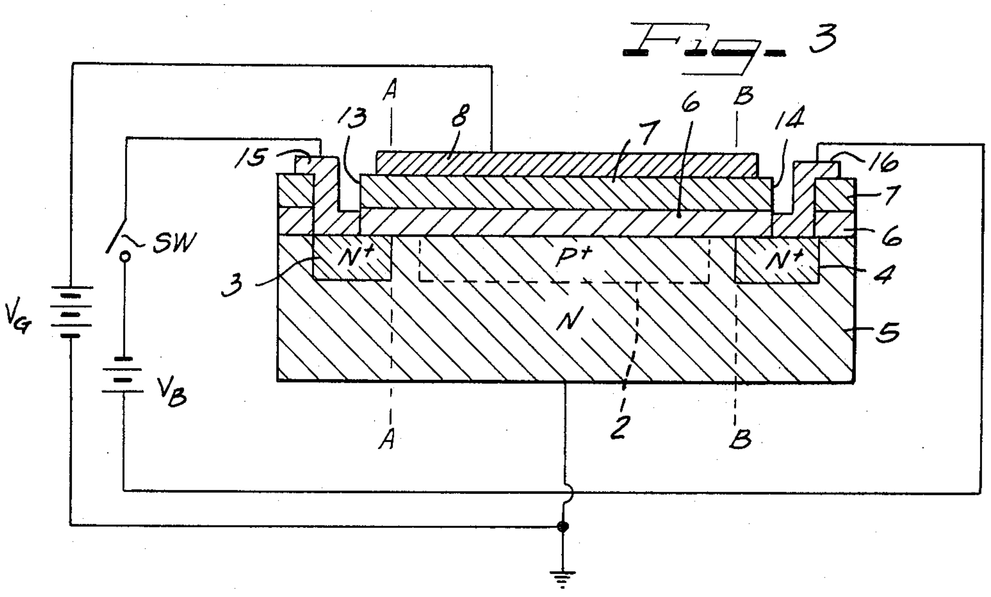
FIG. 3 is a sectional view taken along the lines III—III thereof.

As illustrated in FIGS. 1, 2 and 3, there is shown a continuously variable threshold transistor. More specifically, there is shown a MAOS FET embodying the present invention. This includes a source region 1 of $P^+$ type and a drain region 2 of $P^+$ type formed on an N-type semiconductor substrate 5. Additionally, there is provided two $N^+$ semiconductor regions 3 and 4 formed in opposition to each other on the substrate 5. As is apparent from an examination of FIG. 1, the four regions 1, 2, 3 and 4 make a rectangular figure (it being understood, however, that a square is one form of rectangle). The channel width between the drain and source is preferably less than one micron. On substrate 5 a thin silicon dioxide layer 6 is formed, the thickness of which is about 50 A. to 200 A. On the layer 6 an aluminum oxide layer 7 is formed having a thickness of 700 A. to 2,000 A. Finally, a metal electrode 8 comprising a material such as aluminum is formed thereon.

This results in a chip comprising successive layers of metal-aluminum oxide-silicon dioxide on a silicon substrate (MAOS or MIS).

On applying a voltage V more than the threshold voltage Vo, such for example as 22 volts between the gate electrode 8 and the N-type substrate, an electron charge will be stored in the boundary between the $SiO_2$ layer 6 and the $Al_2O_3$ layer 7. Such storing state can be kept and maintained even after the applied voltage is removed. It may, therefore, be considered a memory device. The threshold voltage Vo will initially be determined by the thickness of $Al_2O_3$ and $SiO_2$ layers, the dielectric coefficient $\epsilon$ of the insulator materials, and the impurity concentration of the substrate.

A source electrode 11 is attached to the source region 1 through a window 9 (FIG. 2). A drain electrode 12 is also attached to the drain region 2 through a window 10. Also, electrodes 15 and 16 are attached, respectively, to the $N^+$ regions 3 and 4 through windows 13 and 14 as shown in FIG. 3.

Figure 4:
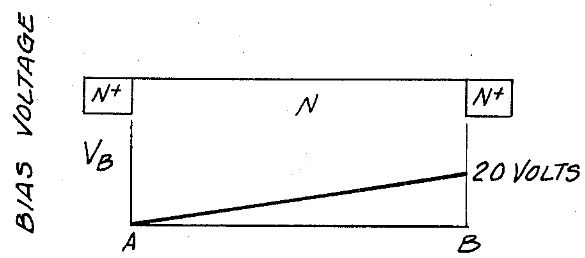
FIG. 4 is a plot of the bias voltage across the width of the FET between the point A and the point B shown in FIGS. 1 and 3.

A DC bias source $V_B$ is connected between the electrodes 15 and 16 through a switch SW and also another DC bias voltage $V_G$ is applied between the gate electrode 8 and the substrate 5. Now, for example, a gate voltage $V_G$ of +42 volts and bias voltage $V_B$ of 20 volts are simultaneously applied thereto. Accordingly, considering the bias voltage $V_B$, an electric potential field is shown in FIG. 4 in which A and B points, corresponds to the A and B sections in FIG. 3; that is, the field will become higher from the A section to the B section.

The gate potential is constant, i.e., +42 volts and therefore, the gate voltage between the gate electrode 8 and the surface of the substrate 5 will be given as $V_G-V_B$, which means there is a dependency on location. Note that at the A section, the effect of the bias voltage $V_B$ is almost zero and hence the gate voltage, 42 volts, is completely applied. On the other hand, on approaching the B section, the voltage between the gate electrode 8 and the surface of the substrate 5 will approach 22 volts (i.e., 42−20), which is near the predetermined initial threshold voltage.

Figure 5:
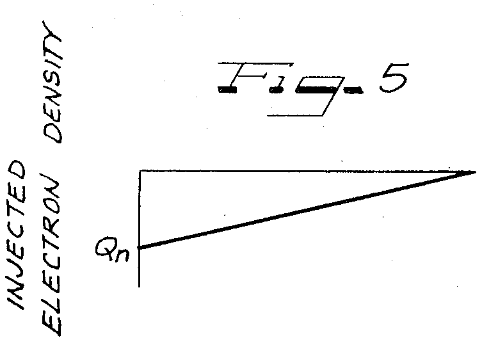
FIG. 5 is a plot of the injected electron density between points A and B.
Figure 6:
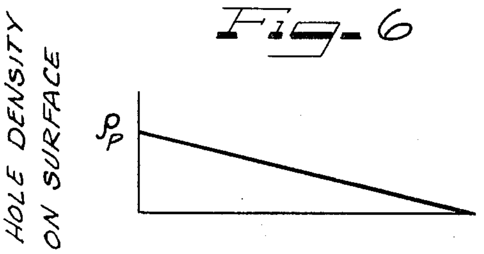
FIG. 6 is a plot of the hole density on the surface.

Since a variable voltage depending upon a location is applied, a trapped carrier density at the boundary between the $Al_2O_3$ layer 7 and the $SiO_2$ layer 6 will also be given as a function of $V_G-V_B$. The stored carrier density $Q_n$ is accordingly shown in FIG. 5. At the section A, a large number of carriers (electrons) will be stored, but at the section B, almost no carrier will be stored. FIG. 6 shows a hole density $\rho$ on the surface of the substrate 5, which corresponds to the stored carrier density $Q_n$ of FIG. 5. The characteristic and operation of the FET constructed as above described are as follows: For FET operation, the source region 1 and the substrate 5 are grounded and according to an input voltage on the gate, the drain current will be changed. This results in a high gm FET.

Figure 8:
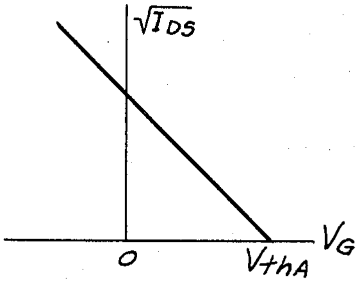
FIGS. 8, 9, 10, 15, 16 and 17 are plots of the drain source current against gate voltage under different operating conditions of the device and indicate the value of the threshold voltage.
Figure 9:
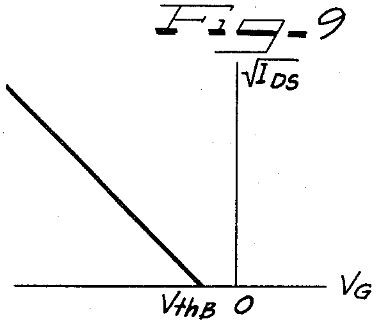

For the purpose of considering the significance of the particular structure above described, let it be assumed that the FET, in fact, is made up of small divided FETs located side by side and extending between the source and drain regions 1 and 2. The characteristic of the small FET at the section A is shown in FIG. 8. From this it is clear that a drain-source current $I_{DS}$ will flow even when there is no gate bias. This is a depletion-type FET and it has a large threshold voltage $V_{thA}$. If we now consider a small divided FET at section B, it will be noted that the characteristic is as shown in FIG. 9. The current $I_{DS}$ will not flow at the zero voltage of the gate, which shows an enhancement-type FET. Accordingly, the FET at B has a very small threshold voltage $V_{thB}$.

Figure 10:
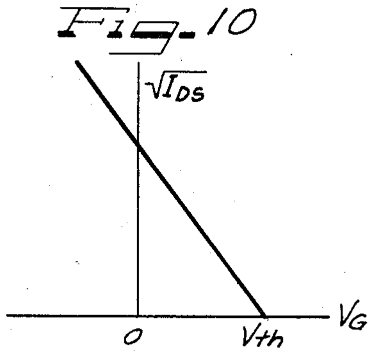
Figure 7:
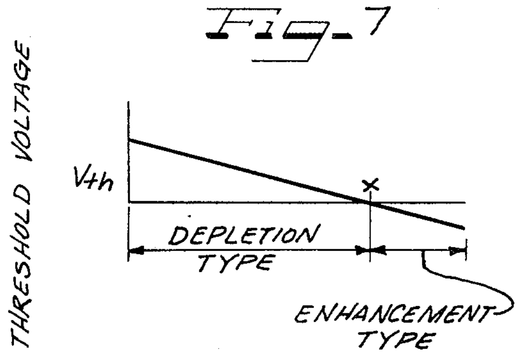
FIG. 7 is a plot of the threshold voltage between points A and B and indicating the portion acting as a depletion-type FET and the portion acting as an enhancement-type FET.

Each of the other small divided FETs between A and B has a different threshold voltage in accordance with it location across the chip and the threshold voltage $V_{th}$ will change continuously from A to B as shown in FIG. 7. Particularly, in FIG. 7, the portion to the left of the cross-point X corresponds to a depletion-type FET and the portion to the right of the point X represents an enhancement-type FET. FIG. 10 shows a final characteristic of the resultant FET of this invention when taken as a whole.

Figure 11:
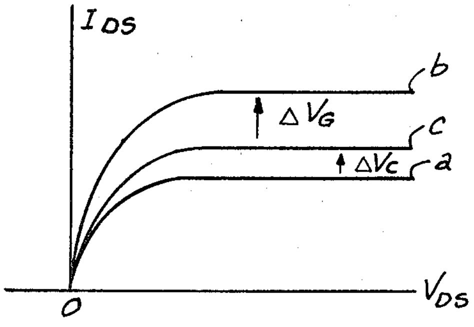
FIG. 11 is a plot of drain source current against drain source voltage under different operating conditions.

FIG. 11 shows a comparison between a conventional MOS FET as represented by the initial curve *a*, which will change to the curve *c* upon the application of the gate voltage. On the contrary, in accordance with the present invention, the curve *a* will change to the curve *b* upon the application of gate voltage. This shows a larger variation from the curve *a* and, therefore, a good triode characteristic is obtained. The curve *b* shows a high gm value as compared to the curve *c*. It is also to be noted that the pinch-off current is so high that the FET of this invention has a good switching characteristic between zero and pinch-off.

Figure 12:
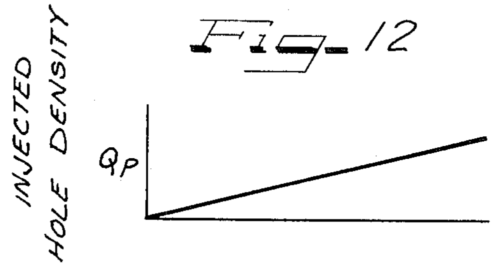
FIG. 12 is a plot of injected hole density across the device between points A and B.
Figure 13:
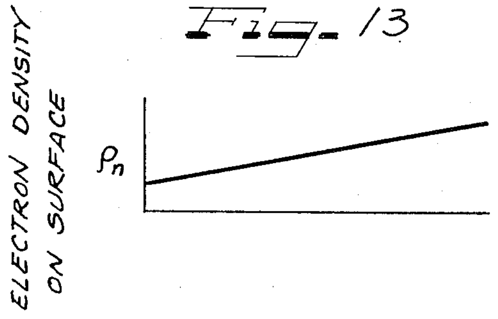
FIG. 13 is a plot of electron density on the surface between points A and B.
Figure 14:
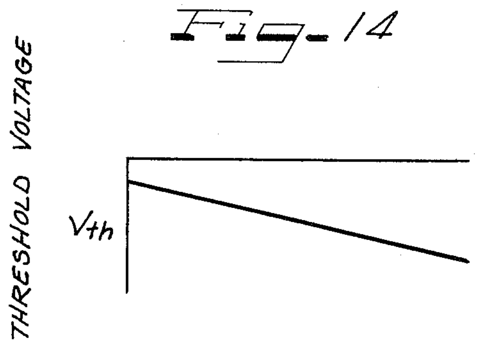
FIG. 14 is a plot showing the variation in threshold voltage between points A and B.
Figure 15:
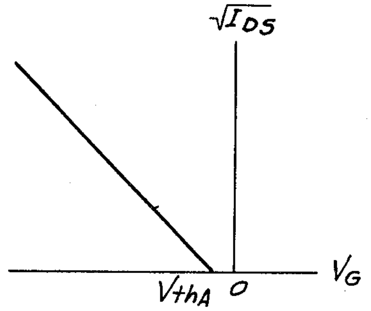
Figure 16:
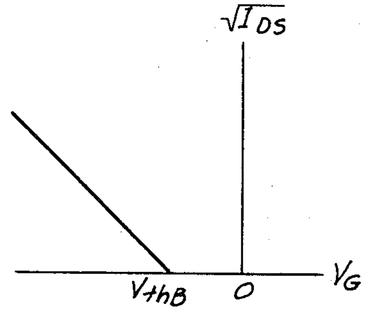
Figure 17:
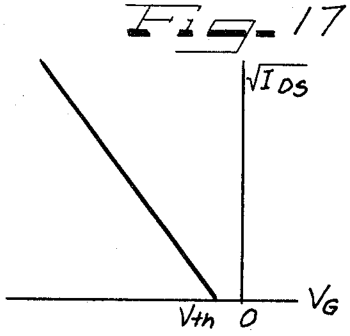

In the embodiment mentioned above, a positive bias voltage or $V_B>0$ and a positive gate bias or $V_G>0$ are simultaneously applied to the FET. In another embodiment of the present invention, a positive bias voltage or $V_B>0$ and a negative gate bias $V_G<0$ is employed. With respect to the bias voltage $V_B$ between the regions 3 and 4, the voltage drop laterally across the FET is shown in FIG. 4. FIG. 12 shows an injected carrier (hole) density $Q_P$ stored between the aluminum oxide 7 and the silicon dioxide layer 6, and accordingly, the electron density $\rho$ on the surface of the substrate 5 will be shown as FIG. 13. The threshold voltage $V_{th}$ between the sections A and B will be given as FIG. 14. At the section A, the small divided FET has a characteristic having a small $V_{th}$ value as shown in FIG. 15. On the other hand, at the section B, the FET has a characteristic having a relatively large $V_{th}$ value shown in FIG. 16. A total characteristic of the FET is shown in FIG. 17, which is of an enhancement-type FET.

These FETs may, of course, be manufactured not only in N-type substrate (P channel) but also in P-type substrate (N channel). Further, MNOS gate (metal-silicon nitride ($Si_3N_4$, 400 A., for example) — silicon dioxide ($SiO_2$, 25 A. for the electron transfer due to tunnel effect) — silicon substrate can be also used in place of MAOS gate mentioned above.

The electrodes 15 and 16 are used only for the prebiasing and after the carrier is stored in the gate portion, the electrodes will not need to be used thereafter. This means that the external leads for the electrodes 15 and 16 are not always necessary. However, the external leads will be necessary if it is required that the stored memory shall be erased and then a new memory for another characteristic is desired. Of course, the external leads for the source, gate and drain are necessary.

According to this invention, a channel width in the lateral direction towards the regions 3 and 4 can be varied in accordance with the gate voltage $V_G$. This means that the capacitance between the gate electrode and the substrate 5 also can be varied subject to the gate voltage.

Figure 18:
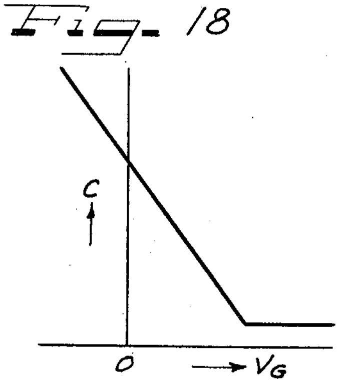
FIG. 18 is a plot showing variation in capacity as a function of gate voltage.

FIG. 18 shows a characteristic of the capacitance C of the device shown in FIG. 1, which has good linearity and a wide range for a variable capacitance. This device, accordingly, can be substituted for a conventional variable capacitor (Vari-cap pn junction diode).

Figure 19:
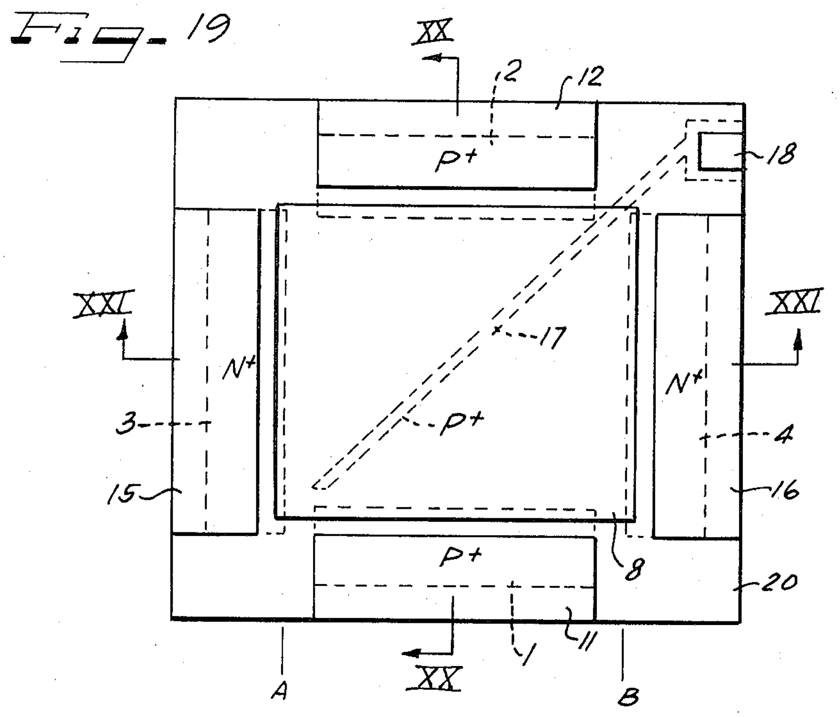
FIG. 19 is a diagrammatic plan view of a modified form of the present invention.
Figure 20:
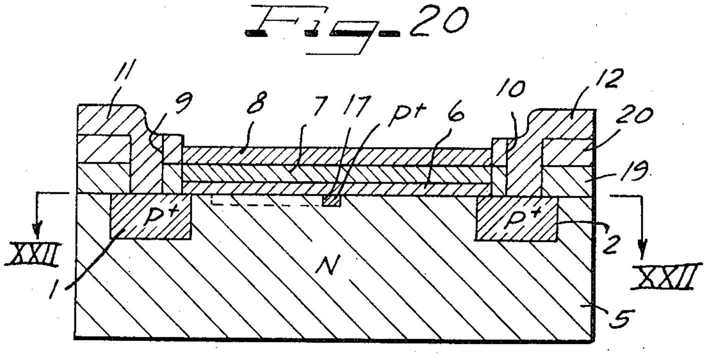
FIG. 20 is a cross-sectional view taken along the lines XX—XX of FIG. 19.
Figure 21:
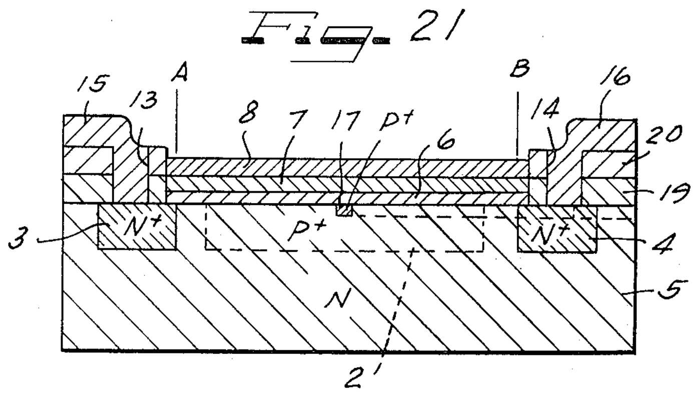
FIG. 21 is a cross-sectional view taken along the lines XXI—XXI of FIG. 19.

FIGS. 19–21 show another example of a FET device for a contactless variable resistor in which a diagonally disposed $P^+$ type strip-like region 17 of $P^+$ type semiconductor material is formed in the upper surface of the substrate 5 under the $SiO_2$ layer 6. An electrode 18 is provided at the outer edge of the strip 17. The $P^+$ region 17 and electrode 18 are easily formed by a well known technique.

Figure 22:
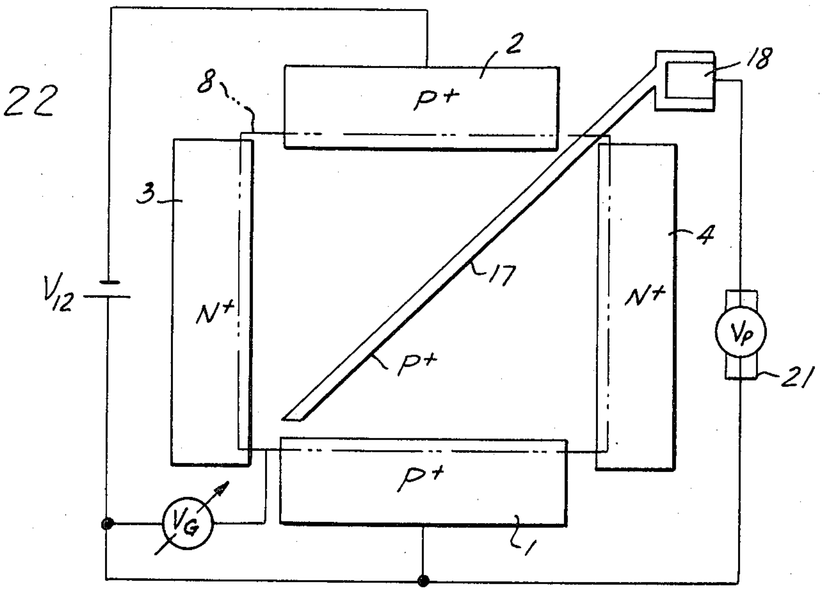
FIG. 22 is a diagrammatic plan view taken along lines XXII—XXII of FIG. 20.

For a variable resistance device, the connections and bias voltages shown in FIG. 22 are suitable; that is, a constant bias voltage $V_{12}$ is applied between the source 1 and drain 2 regions to form a P channel. A variable gate voltage $V_G$ is applied between the gate electrode 8 and source region 1 (the source is connected to the substrate 5, but is not shown).

Figure 25:
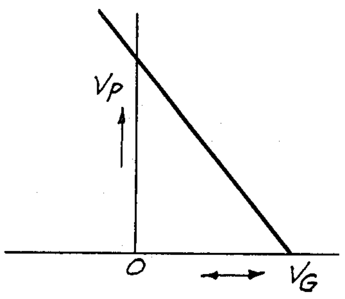
FIG. 25 is a plot of gate voltage against the load voltage $V_P$.
Figure 23:
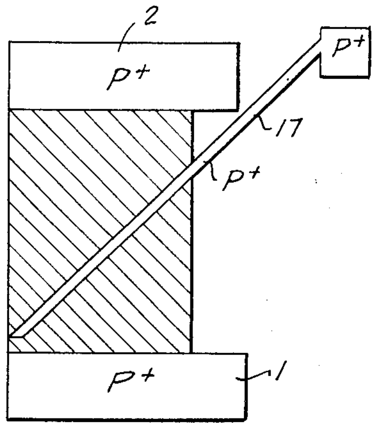
FIGS. 23 and 24 are diagrammatic views illustrating the variation in channel width across the device.
Figure 24:
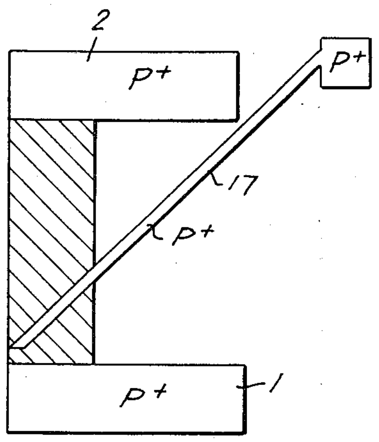

A load or detecting circuit 21 is connected between source 1 and the electrode 18 in which an output voltage $V_P$ can be produced. If the gate voltage is equal to zero, the width of the P channel is very wide and almost extends over the gate region as shown in FIG. 23. A somewhat high output voltage $V_P$ can be derived from the electrode 18. Next, if a plus gate voltage is applied, the depletion-type channel will be reduced in its width as shown in FIG. 24. Accordingly, the $V_P$ will be also reduced depending on the applied voltage to the gate. The $V_P$–$V_G$ characteristic is shown in FIG. 25 (which almost corresponds to FIG. 10).

Figure 26:
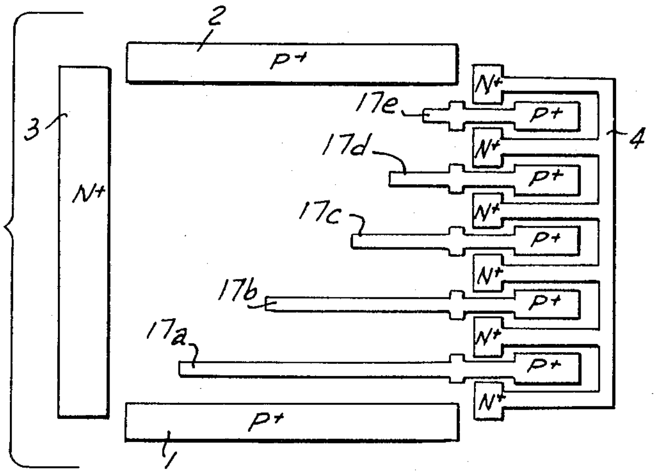
FIG. 26 is a view similar to FIG. 19 but showing a modified form of construction.

FIG. 26 shows another example in which the $P^+$ region 17 is divided into plural regions 17*a*, 17*b*, 17*e* of which length across the gate region is different for each. The $N^+$ region 4 is a comb-type whereby each end of the divided regions 17*a* to 17*e* will be surrounded. Therefore, any bad effect from the source region which may be given to the output $V_P$ in error and the interference between each of the divided regions can, respectively, be avoided by the comb region 4. According to this invention, a contactless variable resistor can thus be obtained, which covers a wide variable range and which has a linear characteristic (or a predetermined characteristic).

Although the invention has been described in connection with the preferred embodiments, it is not to be so limited as changes and modifications may be made which are within the full intended scope of the invention as defined by the appended claims.

We claim as our invention:

1. A continuously variable threshold transistor comprising: a semiconductor substrate of one conductivity type, source and drain regions of opposite conductivity type formed in said substrate, a channel region between said source and drain regions, at least one layer of insulating material substantially covering said channel region, a gate electrode on said insulating material, means for applying a first bias between said substrate and said electrode, and means for applying a second bias to said gate region whereby an electric field is established in said insulator with the field potential distribution being substantially perpendicular to current flow in said channel to establish a graded distribution of charges in said insulating material said distribution being substantially perpendicular to current flow in said channel.

2. A continuously variable threshold transistor as set forth in claim 1 in which said substrate is silicon and in which said layer of insulating material includes a first layer of silicon dioxide and a second layer of aluminum oxide.

3. A continuously variable threshold transistor as set forth in claim 1 in which said substrate is silicon and in which said layer of insulating material includes a first layer of silicon dioxide and a second layer of silicon nitride.

4. A continuously variable threshold transistor according to claim 1, wherein a strip shaped region of opposite conductivity type is formed in said substrate and extends generally diagonally between said source and drain regions so that one end of said strip lies adjacent said source region and the opposite end lies adjacent said drain region, and a load connected between said source region and said opposite end of said strip shaped region.

5. A continuously variable threshold transistor according to claim 1 comprising a plurality of parallel strip shaped regions of opposite conductivity type formed in said substrate, said plurality of strip shaped regions extending in a direction substantially perpendicular to current flow in said channel and said strip shaped region adjacent said source region being substantially longer than the strip shaped region adjacent said drain region.

6. A continuously variable threshold transistor according to claim 5, wherein said plurality of strip shaped regions lying between said source and drain regions become progressively shorter as said drain region is approached.

7. A continuously variable threshold transistor according to claim 1, wherein said means for applying a second bias comprise a pair of electrodes mounted on opposite sides of said channel.

* * * * *